(12) United States Patent
Horovitz et al.

(10) Patent No.: US 12,056,121 B2
(45) Date of Patent: Aug. 6, 2024

(54) SYSTEM, METHOD AND COMPUTER PROGRAM PRODUCT FOR QUERY-OPTIMIZATION

(71) Applicant: HOLISTO LTD., Rishon LeTsiyon (IL)

(72) Inventors: Shay Horovitz, Rishon LeZion (IL); Eran Shust, Rishon LeZion (IL); Avraham Wortzel, Flushing, NY (US)

(73) Assignee: HOLISTO LTD., Rishon le Tsiyon (IL)

( * ) Notice: Subject to any disclaimer, the term of this patent is extended or adjusted under 35 U.S.C. 154(b) by 0 days.

(21) Appl. No.: 18/029,969

(22) PCT Filed: Oct. 10, 2021

(86) PCT No.: PCT/IL2021/051210
§ 371 (c)(1),
(2) Date: Apr. 3, 2023

(87) PCT Pub. No.: WO2022/074659
PCT Pub. Date: Apr. 14, 2022

(65) Prior Publication Data
US 2023/0367770 A1 Nov. 16, 2023

Related U.S. Application Data

(60) Provisional application No. 63/090,186, filed on Oct. 10, 2020.

(51) Int. Cl.
*G06F 16/24* (2019.01)
*G06F 11/34* (2006.01)
(Continued)

(52) U.S. Cl.
CPC ...... *G06F 16/2453* (2019.01); *G06F 11/3409* (2013.01); *G06F 16/2462* (2019.01)

(58) Field of Classification Search
CPC .............. G06F 16/2453; G06F 16/2462; G06F 11/3409
See application file for complete search history.

(56) References Cited

U.S. PATENT DOCUMENTS 8,401,991 B2 * 3/2013 Wu .................... G06F 16/20
707/602
10,255,454 B2 * 4/2019 Kamara .................. H04L 9/008
(Continued)

OTHER PUBLICATIONS

Lawinsider.com, "Look to Book Ratio definition", retrieved on Jun. 26, 2023 from: [https://www.lawinsider.com/dictionary/look-to-book-ratio].
(Continued)

*Primary Examiner* — Eliyah S. Harper
(74) *Attorney, Agent, or Firm* — The Roy Gross Law Firm, LLC; Roy Gross

(57) ABSTRACT

Minimizing queries by sending first query/ies, including query parameter/s having first query parameter value/s respectively, to a database, and receiving therefrom, response/s to the first query/ies respectively; and using at least the query/ies and response/s to compute a model which approximates the database's behavior, the behavior including generating responses pursuant to queries received. The model serves as current model, unless/until replaced by a later computed model. The method may iterate as follows at least once: selecting query/ies, more distant from the first query's query parameter/s than query/ies not selected; sending the selected query/ies to the database and using a received database's response, and the selected query/ies, and query-response pair/s already used, to compute another model of the database's behavior which serves as current model, unless and until replaced by a later computed model.

12 Claims, 1 Drawing Sheet

Operation 1: Execute or send a small set of queries (at least one query), selected from the universe of queries, to the relevant database.

Operation 2: receive, from the database, e.g. via an API, and/or Query Language and/or file system, a small set of responses (e.g., level of urgency, cost, recommended delivery method, recommended manufacturing facility, recommended route) which respectively correspond or "reply to" to the queries in the small set.

Operation 3: divide the small set of queries and responses, received in operation 2, into a training set and test set.

Operation 4: the system may determine whether the training set and/or test set include one or more anomalies that do not follow the behavior of the database as learned (e.g. using a current model) from most of the queries-responses in the small set.

Operation 5: If anomalies are identified in Operation 4, the system may store each anomaly's query parameters in an anomalies' database. These stored anomalies can later be used for future anomalies, instead of the learned model that represents the behavior of the data minus the anomalies.

Operation 6: based on the query-response pairs in the training set (typically without anomalies), compute a regression model describing the behavior of the database being queried. If several databases are being queried, a separate regression model is typically computed for each.

Operation 7: send, to database, query whose estimated level of statistical confidence is lower e.g. whose query parameters are far from parameters of queries already asked and answered by the database Operation 8: compute the accuracy of the current model, then stop here, if stopping criterion is met (regression model is sufficiently accurate), else, return to Operation 4

(51) Int. Cl.
    *G06F 16/2453*     (2019.01)
    *G06F 16/2458*     (2019.01)

(56) References Cited

U.S. PATENT DOCUMENTS

| | | | | |
|---|---|---|---|---|
| 11,263,277 | B1* | 3/2022 | Podgorny | G06F 16/3329 |
| 11,538,467 | B1* | 12/2022 | Feyisetan | G10L 15/1815 |
| 2009/0327264 | A1* | 12/2009 | Yu | G06F 16/951 |
| | | | | 707/999.005 |
| 2013/0132377 | A1* | 5/2013 | Lin | G06F 16/583 |
| | | | | 707/723 |
| 2014/0188768 | A1* | 7/2014 | Bonissone | G06N 20/00 |
| | | | | 706/12 |

OTHER PUBLICATIONS

Google Analytics (2021) "Limits and Quotas on API Requests", Aug. 26, 2021; Retrieved from: [https://web.archive.org/web/20210826120617/https://developers.google.com/analytics/devguides/config/mgmt/v3/limits-quotas].

Docker.com (2020), "Understanding Your Docker Hub Rate Limit", Nov. 20, 2020. Retrieved from: [https://www.docker.com/increase-rate-limits/#:~: text=The%20rate%20limits%20of%20100].

USDA National Institute of Food and Agriculture (NIFA) (2021). "REEport", Sep. 2, 2021. Retrieved from: [http://web.archive.org/web/20210902143246/https://portal.nifa.usda.gov/cas/login].

Valente, J., Sanz, D., Barrientos, A., Del Cerro, J., Ribeiro, Á., & Rossi, C. (2011). An air-ground wireless sensor network for crop monitoring. Sensors, 11 (6), 6088-6108. https://doi.org/10.3390/s110606088.

Wikipedia.org (2021). "Query language", Aug. 21, 2021. Retrieved from: [https://en.wikipedia.org/wiki/Query_language].

Oracle.com (2021). "'16.2.3.2. Using memcached as a MySQL Caching Layer", Sep. 17, 2021. Retrieved from: [https://web.archive.org/web/20210917233413/https://docs.oracle.com/cd/E17952_01/mysql-5.6-en/ha-memcached-mysql-frontend.html].

Tsymbalov, E. et al. (2018). "Dropout-based Active Learning for Regression". arXiv:1806.09856. Retrieved from: [https://web.archive.org/web/20220308045853/https://arviX.org/abs/1806.09856].

Mitsa, Theophano (2019). "How Do You Know You Have Enough Training Data?", Medium.com, Jan. 20, 2021. Retrieved from: [https://web.archive.org/web/20210120023342/https://towardsdatascience.com/how-do-you-know-you-have-enough-training-data/ad9b1fd679ee].

Wikipedia.org (2021), "Vapnik-Chervonenkis theory", Mar. 31, 2021. Retrieved from: [https://web.archive.org/web/20210331174805/https://en.wikipedia.org/wiki/Vapnik%E2%80%93Chervonenkis_theory].

Wikipedia.org (2022), "Confidence Interval", Jan. 10, 2022. Retrieved from: [https://web.archive.org/web/20220110011944/https://en.wikipedia.org/wiki/Confidence_interval].

Brownlee, J. (2020). "A Gentle Introduction to Imbalanced Classification". Retrieved Jun. 26, 2023. [https://machinelearningmastery.com/what-is-imbalanced-classification/].

Swiler, Laura (2019). "Gaussian Process Models" [powerpoint presentation]. Sandia National Laboratories. SAND2019-9565C. Uncertainty Quantification Summer School, Sponsored by the Doe Fastmath Institute and USC Aug. 14-16, 2019.

Sarkar, D. (2018). "Categorical Data", Jan. 6, 2018. Retrieved from: [https://towardsdatascience.com/understanding-feature-engineering-part-2-categorical-data-f54324193e63].

National Oceanic and Atmospheric Administration (NOAA), U.S. Department of Commerce (2017). "6 Tools Our Meterologists Use to Forecast the Weather", Aug. 14, 2017. Retrieved from: [https://www.noaa.gov/stories/6-tools-our-meteorologists-use-to-forecast-weather].

Cloudflare.com, "What is a Web Crawler? | How web spiders work". Retrieved from: [https://www.cloudflare.com/learning/bots/what-is-a-web-crawler/].

Toth, Attila (2017). "Is Web Scraping Legal? 6 Misunderstandings About Web Scraping", Nov. 17, 2017. Retrieved from: [https://web.archive.org/web/20210805045959/https://www.import.io/post/6-misunderstandings-about-web-scraping/].

Sharma, K. (2020). "The Best (FREE) Data Repositories for Aspiring Data Scientists", Jan. 26, 2020. Retrieved from: [https://towardsdatascience.com/the-best-free-data-repositories-for-aspiring-data-scientists-in-2020-886d8785ebac].

Microsoft.com (2022). "Service Limits in Azure Cognitive Search", Dec. 7, 2022. Available online: [https://web.archive.org/web/20230206055300/https://learn.microsoft.com/en-US/azure/search/search-limits-quotas-capacity].

Yongjoo Park et al: "Database Learning Toward a Database that BecomesSmarter Every Time", arxiv.org, Cornell University Library, 201 Olin Library Cornell University Ithaca, NY 14853, Mar. 28 pp. 1-19, XP080757382, DOI: 10.1145/3035918.3064013.

Jun Du et al: "Active Learning with Generalized Queries", Ninth IEEE International Conference on Data Mining, 2009 (ICDM '09) ,IEEE, Piscataway, NJ, USA, Dec. 6, 2009 (Dec. 6, 2009), pp. 120-128 XP031585326, ISBN: 978-1-4244-5242-2. doi: 10.1109/ICDM.2009.71.

Fotis Savva et al: "Adaptive Learning of Aggregate Analytics under Dynamic Workloads", arxiv.org, Cornell University Library, 201 Olin Library Cornell University Ithaca, NY 14853, Aug. 13 pp. 1-11, XP081461273. https://doi.org/10.48550/arXiv.1908.04772.

PCT International Search Report for International Application No. PCT/IL2021/051210, mailed Jan. 24, 2022, 3pp.

PCT Written Opinion for International Application No. PCT/IL2021/051210, mailed Jan. 24, 2022, 7pp.

* cited by examiner

Operation 1: Execute or send a small set of queries (at least one query), selected from the universe of queries, to the relevant database.

Operation 2: receive, from the database, e.g. via an API, and/or Query Language and/or file system, a small set of responses (e.g., level of urgency, cost, recommended delivery method, recommended manufacturing facility, recommended route) which respectively correspond or "reply to" to the queries in the small set.

Operation 3: divide the small set of queries and responses, received in operation 2, into a training set and test set.

Operation 4: the system may determine whether the training set and/or test set include one or more anomalies that do not follow the behavior of the database as learned (e.g. using a current model) from most of the queries-responses in the small set.

Operation 5: If anomalies are identified in Operation 4, the system may store each anomaly's query parameters in an anomalies' database. These stored anomalies can later be used for future anomalies, instead of the learned model that represents the behavior of the data minus the anomalies.

Operation 6: based on the query-response pairs in the training set (typically without anomalies), compute a regression model describing the behavior of the database being queried. If several databases are being queried, a separate regression model is typically computed for each.

Operation 7: send, to database, query whose estimated level of statistical confidence is lower e.g. whose query parameters are far from parameters of queries already asked and answered by the database

Operation 8: compute the accuracy of the current model, then stop here, if stopping criterion is met (regression model is sufficiently accurate), else, return to Operation 4

SYSTEM, METHOD AND COMPUTER PROGRAM PRODUCT FOR QUERY-OPTIMIZATION

REFERENCE TO CO-PENDING APPLICATIONS

Ths application is a National Phase of PCT Patent Application No. PCT/IL2021/051210 having International filing date of Oct. 10, 2021, which claims the benefit of priority U.S. Provisional Patent Application No. 63/090,186 entitled "Query-optimal methods for predicting hotel prices" and filed Oct. 10, 2020, the contents of which are all incorporated herein by reference in their entirety.

FIELD OF THIS DISCLOSURE

The present invention relates generally to computerized data repositories, and more particularly to efficient submission of queries to computerized data repositories.

BACKGROUND FOR THIS DISCLOSURE

Some web sites or data repositories or databases have limitations e.g. related to hacking prevention, typically comprising a "call limit" of number of requests per second or per IP/session.

In Traveltech, some servers use a Look2Book limit e.g. as described in the following link: https://www.lawinsider.com/dictionary/look-to-book-ratio.

Call limits are described in the following link (https://developers.google.com/analytics/devguides/config/mgmt/v3/limits-quotas). Similarly, some websites limit their users to n searches per time unit. Anonymous and Free Docker Hub users are limited to 100 and 200 container image pull requests per six hours e.g. as described here: https://www.docker.com/increase-rate-limits#:~:text=The%20rate%20limits%20of%20100,the%20six%20hour%20window%20elapses.

In crop monitoring and pollution monitoring, Agricultural Air Pollution Monitors are known and are described e.g. in https://portal.nifa.usda.gov Installation of plural monitoring devices around agricultural lands and CAFOs to monitor gas pollutants at configurable time intervals and reading measurements therefrom is known.

Air-Ground Wireless Sensor Networks for Crop Monitoring are known and are described e.g. in https://www.researchgate.net. (see e.g. "An Air-Ground Wireless Sensor Network for Crop Monitoring", by João Valente, David Sanz, Antonio Barrientos*, Jaime del Cerro, Ângela Ribeiro et al.

Query languages are known, e.g. as described in: https://en.wikipedia.org/wiki/Query_language Using a Key-Value "db" (such as Redis/Memcached products) for caching DB queries is known and is described e.g. here: https://docs.oracle.com/cd/E17952_01/mysql-5.6-en/ha-memcached-mysql-frontend.html Dropout-based Active Learning for Regression is described here: https://arxiv.org/abs/1806.09856

Conventional methods to estimate training-set size are described in: https://towardsdatascience.com/how-do-you-know-you-have-enough-training-data-ad9b1fd679ee)

A method for computing a suitable training data size out of a population using VC dimensions may rely on Vapnik Chervonenkis theory, e.g. as described here: https://en.wikipedia.org/wiki/vapnik%e2%80%93chervonenkis_theory. This is suitable for use-cases where a "VC complexity estimate" of the data is available.

Statistical Confidence intervals are known and are described e.g. in https://en.wikipedia.org/wiki/Confidence interval.

In classification problems, the distribution of examples across the known classes may be "biased". If "class imbalance" is present, the class distribution is not equal, or is far from equal and is instead biased or skewed e.g. as described in https://machinelearningmastery.com/what-is-imbalanced-classification/.

Gaussian Process Models are known and are described for example in https://www.ima.umn.edu/materials/2014-2015/ND6.15-26.15/23762/IMA_GP_Swiler1.pdf.

Converting categorical data into numerical data is known and is described e.g. in https://towardsdatascience.com/understanding-feature-engineering-part-2-categorical-data-f54324193e63

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to reduce query submission to databases in use-cases where such queries have explicit or implicit cost, including identifying that response values replied by such queries follow a set of learnable behaviors or trends.

Certain embodiments of the present invention seek to provide a computerized system configured to learn a physical process efficiently, the system including a hardware processor configured for all or any subset of:

a. Sampling a process to be learned e.g. by sending n queries to the process and receiving n responses to the n queries respectively;

b. Deriving, from the n responses to the n queries, a model (e.g. regression model, neural net) of the process. For a regression model, any suitable technology may be used such as but not limited to linear regression, SVR (based on support vectors), deep neural networks, Ridge regression, Bayesian regression, SGD based regression, Gaussian Process Regression, Regression Trees.

c. Generating a test set of queries designed to test the model. Typically, generation of test queries selects a combination of variables or query parameters where the model has larger uncertainty, over at least one combination of variables or query parameters where the model has smaller uncertainty;

d. Upon receipt of responses to the queries designed to test the model, deciding whether to affirm the model (in which case, typically, end operation of the processor) or to abandon the model and go back to model-generating step in which case, typically, new data is added to the existing data.

e. Usage of the learnt model to respond to queries without sending the queries to the physical process.

The process may comprise an unknown function which returns a response (dependent variable/s) to each set of independent variable/s.

Certain embodiments seem to optimize database usage from the viewpoint of the user of the database. A database's user typically comprises a server which automatically sends queries to the database, sometimes on behalf of users of the server, which may, or may not, comprise human end-users (e.g. of a web-service controlled by the server). Some data repositories or databases or providers impose costs per query and/or limits on the number of queries; such costs and limits are problematic for users (which may be servers themselves) of such data repositories or databases or providers. Limits include, for example, look to book type limits, and Call limits. Certain embodiments herein seeks to improve usage of such databases, from the viewpoint of the user (e.g. server) of the database, especially in use-cases in which query responses can be predicted due to a behavioral pattern present in the database or provider, which can then be learnt efficiently by servers using the database, e.g. as described herein, to minimize or reduce the total number of queries that need be sent, by the server, to the database.

Certain embodiments of the present invention seek to provide circuitry typically comprising at least one hardware processor in communication with at least one memory, with instructions stored in such memory executed by the processor to provide functionalities which are described herein in detail. Any functionality described herein may be firmware-implemented or processor-implemented, as appropriate.

Certain embodiments of the present invention seek to provide a machine learning method including sampling a process or behavior to be learned e.g. by sending n queries to the process and receiving n responses to the n queries respectively, and/or generating a model to predict the behavior or process and/or generating queries designed to test the model and/or, upon receipt of responses to the queries designed to test the model, deciding whether to affirm the model, or to abandon the model, and go back to the model-generating step.

Certain embodiments seek to provide a Traveltech system that interacts with provider servers and, as part of the interaction with these servers, builds and stores a model for hotel deals for at least one hotel, and, more typically, multiple hotels and at least one provider including a hardware processor configured to accept proposed hotel deals, and, responsively, to return a query response e.g. cost for each such deal. More typically, there are multiple such providers.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operations from yet another processor/s P', may be deployed off-shore relative to P, or "on a cloud", and so forth.

Thus the present invention typically includes at least the following embodiments:

Embodiment 1. A method for minimizing queries to a database, the method comprising sending at least one first query, having at least one query parameters having at least one first query parameter values respectively, to the database, and receiving, from the database, at least one response to the at least one query respectively; and/or using at least the query and the response to compute a model which approximates the database's behavior wherein the behavior includes generating responses in reply to queries received, and wherein the model which approximates the database's behavior serves as the method's current model, unless and until the method's current model is replaced by a later computed model; and/or at least once performing the following e.g. as at least one iteration:

selecting at least one query, from a universe of queries including plural queries, each having parameters, wherein the plural queries' parameters are at plural respective distances from the at least one first query's at least one query parameters; and wherein the at least one query which is selected, is more distant from the at least one first query's at least one query parameters than is at least one query in the universe which is not selected; and/or sending the at least one query which was selected from the universe, to the database, receiving the database's response; and using: the database's response, and the at least one query selected from the universe, and/or at least one query and response already used, to compute another model of the database's behavior, wherein the another model serves as the method's current model, unless and until the method's current model is replaced by a later computed model.

Embodiment 2. A method according to any of the preceding embodiments wherein the selecting and the sending are repeated unless the method's current model satisfies a stopping criterion.

Embodiment 3. A method according to any of the preceding embodiments wherein the stopping criterion is applied to the current model's accuracy level.

Embodiment 4. A method according to any of the preceding embodiments and wherein the at least one query which is selected, is, relative to plural other queries in the universe of queries, which were not yet selected, most distant from the at least one first query's at least one query parameters.

Embodiment 5. A method according to any of the preceding embodiments and wherein the at least one query which is selected, is, relative to most other queries not yet selected in the universe of queries, most distant from the at least one first query's at least one query parameters.

Embodiment 6. A method according to any of the preceding embodiments and wherein the at least one query which is selected, is, relative to all other queries in the universe of queries which were not yet selected, most distant from the at least one first query's at least one query parameters.

Embodiment 7. A method according to any of the preceding embodiments wherein regression is used to compute the model which approximates the database's behavior.

Embodiment 8. A method according to any of the preceding embodiments wherein the current model is used to generate responses to at least one query which is not sent to the database.

Embodiment 9. A method according to any of the preceding embodiments wherein at least one query sent to the database by the method, is an anomaly whose response does not fit the current model, and wherein at least one later computed model, computed later than the current model, is computed without relying on the query which is an anomaly and on the response to the query which is an anomaly.

Embodiment 10. A method according to any of the preceding embodiments wherein at least one query which is an anomaly, is used to generate a response to at least one subsequent query which is not sent to the database and wherein the at least one query which is an anomaly has at least one parameter which is identical to at least one parameter of the at least one subsequent query.

Embodiment 11. A system comprising at least one hardware processor configured to carry out the operations of any of the methods of embodiments 1-10.

Embodiment 12. A computer program product, comprising a non-transitory tangible computer readable medium having computer readable program code embodied therein, the computer readable program code adapted to be executed to implement a method for minimizing queries to a database, the method comprising:

sending at least one first query, having at least one query parameters having at least one first query parameter values respectively, to the database, and receiving, from the database, at least one response to the at least one query respectively;

using at least the query and the response to compute a model which approximates the database's behavior wherein the behavior includes generating responses in reply to queries received, and wherein the model which approximates the database's behavior serves as the method's current model, unless and until the method's current model is replaced by a later computed model;

at least once:

selecting at least one query, from a universe of queries including plural queries, each having parameters, wherein the plural queries' parameters are at plural respective distances from the at least one first query's at least one query parameters; and wherein the at least one query which is selected, is more distant from the at least one first query's at least one query parameters than is at least one query in the universe which is not selected;

sending the at least one query which was selected from the universe, to the database, receiving the database's response; and using:

the database's response, and the at least one query selected from the universe, and at least one query and response already used, to compute another model of the database's behavior, wherein the another model serves as the method's current model, unless and until the method's current model is replaced by a later computed model.

Also provided, excluding signals, is a computer program comprising computer program code means for performing any of the methods shown and described herein when the program is run on at least one computer; and a computer program product, comprising a typically non-transitory computer-usable or readable medium e.g. non-transitory computer-usable or readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above, which may be written in any conventional programming language, and optionally a machine for executing the program such as but not limited to a general purpose computer, which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices, or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components, and, alternatively, may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein e.g. any database shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof, and back-end logic interacting therewith. Thus the term user interface or "UI" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

FIG. 1 is a simplified flowchart illustration of an example method for query optimization according to certain embodiments. The method of FIG. 1 typically comprises all or any subset of the illustrated operations, suitably ordered e.g. as illustrated.

Arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

Computational, functional or logical components described and illustrated herein can be implemented in various forms, for example, as hardware circuits, such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments include providing a server which generates a finite number of commands (e.g.: queries to a database "commanding" the database to respond to the query), wherein each command results in actions (e.g. generation of query responses) being performed by any non-human actuator (e.g. database automatically looks up responses to queries), including returning feedback (e.g. query responses) to the server which generates the finite number of commands. The server then uses the feedback to generate a model which automatically predicts feedback to commands selected from a population of commands, where the finite number of commands actually sent is but a subset of the larger population of commands and wherein the model automatically generates or selects a command within the larger population of commands which (a) was not included in the finite number of commands sent to the non-human actuator and/or (b) typically differs from those commands which are finite in number, more than other non-selected commands do.

Once the server learns a model that represents what the server thinks about the response value, or what response value the server provides, the server then may generate a next query, rather than (or in addition to) predicting next queries' response/feedback. Each query is typically defined by a set of parameters. For example, if queries pertain to hardware processors, parameters may include # of Cores, # of Threads, Processor Base Frequency, bus speed, Max Memory Size, Max # of Memory Channels, Max Memory Bandwidth and so forth.

One use-case is when the server generates commands, each of which is a query to a database or electronic data repository, in which case the action/s performed by the repository include providing the feedback which in this use-cases includes responses to the queries. The server then uses the responses to generate a model (e.g. regression model or any other Artificial Intelligence model) which automatically predicts responses to queries selected from a population of queries, where the finite number of queries sent is but a subset of the larger population of queries, and wherein the server automatically generates or selects at least one query within the larger population of queries which was not included in the finite number of queries sent to the data repository.

For example, in the Traveltech industry, providers may use Look-to-Book and/or Call-Limit mechanisms in order to optimize their database services which are utilized by providers' end users' sending queries to the providers' databases. As such, their customers or end-users (entities such as, but not limited to OTAs) are limited with the number of queries that can be sent to each provider. One solution is for an end-user e.g. OTA to have a caching mechanism that can save historical queries which, in the past, the OTA has sent to various providers. This solution is effective, however, only for queries which repeat with the exact same parameters (such as query date, number of nights, location). As the number of parameters affecting query response and/or their scale grows, the efficiency of the caching solution declines. In addition, cached query responses can become irrelevant over time as costs change for some hotels.

Conventional machine learning methods use a training set. The creation of the training set is costly as it requires many queries. For some providers creation of such a training set is not possible, due to their strict limitations.

For example, in a typical use case, the training set may be chosen randomly out of a relevant population of queries (e.g. a search space of such queries). Yet, if the query response values are generated by a limited known set of behavioral patterns, the system's knowledge of the behaviors may be used to create a minimal training set.

For example, the behavior may be known to be (e.g. may be fitted to) a known superposition of plural Gaussian functions (plural behavioral patterns, each of which is Gaussian). Or, the responses provided by the database, as a function of the query parameters, may be fitted to a known set of planes (e.g. linear hyperplanes) or splines.

It is appreciated that there may be bias between various behaviors. For example, one behavior (e.g. Gaussian, or any other suitable function) may fit 90% of the data collected so far, and another Gaussian may fit only 10% of data collected thus far.

References herein to Gaussian functions are merely exemplary; instead, other (typically analytic) functions such as, say, splines, may be employed.

It is appreciated that the bias between behaviors of response values is typically higher for a randomly chosen training set, relative to training sets, which, e.g. as described herein, are (at least from the second iteration onward) not randomly selected, and are instead selected based on a current model of the database. Selection of the training set typically becomes less and less random as the method progresses from iteration to iteration.

Therefore, more data is typically collected in the case of a randomly chosen training set. If the sampled training set is not statistically significant, it will be impossible to use the model learned by this training set to predict query responses with good accuracy (for example –_R _squared of 0.9, where R-squared represents closeness of data to a regression line (or sub-space) fitted to the data).

Therefore, typically, a model which explains the responses which the database returns for various queries, can be learned with a minimal number of queries, and may support non-fixed or non-uniform behavior of the database which generates responses when queried). If the database's behavior is "non-uniform", the database's responses to a given query do not remain the same if the same query is presented over various days.

FIG. 1 is a simplified flowchart illustration of a method which may implement the above solution. The following operations, or any subset thereof, may be performed, in any suitable order e.g. as follows:

Operation 1: Execute or send a small set of queries to a relevant database. The size of the set (number of queries) may depend on the dimension of the problem. Any suitable conventional method may be used to estimate training-set size. Or, typically, if the system is tasked with predicting query responses, where the queries have only 2 dimensions (e.g. queries differ between them only along 2 "input" dimensions) (say, hotel room costs for the coming 30 days, where queries differ between them only vis-a-vis length of stay and time till travel), 5-6 queries, or even just 1 query, is enough for this stage of the process, after which the process moves on to other sophisticated processing e.g. as described herein.

The small set can be randomly selected from the universe of queries. Or, the small set may be extracted by a suitable algorithm. For example, the system can compute this set according to the popularity of earlier searches stored in the system. For example, for a particular hotel, queries regarding a 1 night stay for tomorrow night is the most popular, queries regarding 2 nights stay for tomorrow is next, 2 nights stay for the day after tomorrow is next, and so on, depending on the distribution of historical searches for a particular hotel.

It is appreciated that non-numerical query parameters may be coded into numbers. e.g. (for a hotel reservation database use-case) bed-and-breakfast=1, half-pension=2, full pension=3.

It is appreciated that records stored in a single database may alternatively be partitioned into plural databases each storing some of the records, and the method of FIG. 1 may be performed on each of the plural databases. For example, queries may be sent re urgency of various repairs to hardware belonging to various end-users, given certain parameters of the hardware and/or of the reported malfunction thereof. All queries regarding all types of hardware may be stored in a single database, or, alternatively, the available records may be partitioned into 3 databases respectively storing records pertaining to malfunctions of first, second and third types of hardware (e.g. printers, keyboards and computer-screens). Or, a website may provide, as a web service to end-users, quotes for stays at plural hotels, and a separate database may be stored by the server associated with the website, for each of the plural hotels.

Operation 2: receive, from the database, a small set of query responses (e.g., level of urgency, price, recommended delivery method, recommended manufacturing facility, recommended route) which respectively correspond or "reply to" to the queries in the small set. Operation 3: divide the small set of queries and responses into a training set and test set.

Operation 4: Determine whether the training set and/or test set include one or more anomalies e.g. query responses that do not follow the behavior of the database as learned from most of the queries-responses in the small set.

It is appreciated that, while the number of points (query-response pairs) is small (in the first few iterations e.g.), the model is likely to be highly inaccurate e.g. its estimations will be characterized by an enormous error, however as more points (queries+responses) accumulate, accuracy improves (in later iterations).

For example, the behavior can be a decrease by Z % (in the response value as a parameter of the query increases) and then an increase by X % (in the response value as a parameter of the query increases) and then again, a decrease, this time by Y % (in the response value as a parameter of the query increases), and so forth. The behavior may, for example, be a trend such as an increasing curve (such as an increasing linear function) or decreasing curve (which again may or may not be a linear function). Anomalies are typically queries whose responses differ significantly from the majority of the queries/responses.

Example: a specific hotel has an increasing cost per room as the time to travel (TTT) query parameter increases, thereby to define a trend. However, on a certain date there is an event (e.g. conference) in that hotel, hence room-costs on that particular date (and perhaps even on the day before or after) do not follow the trend. Holidays, high season and weekends can also cause data anomalies.

Regarding the current model used in operation 4, it is appreciated that this may later be superseded e.g. if operation 6 is repeated, as described herein.

Still with reference to operation 4, any suitable e.g. conventional anomaly detection technique may be used to extract anomalies, such as but not limited to: Density-based techniques including k-nearest neighbor, local outlier factor, isolation forests; Subspace-, correlation-based and tensor-based outlier detection if the data is high-dimensional, One-class support vector machines, Bayesian networks, Hidden Markov models, Cluster analysis-based outlier detection, Fuzzy logic-based outlier detection, and so forth.

Typically, in the first iteration of the method of FIG. 1, anomalies are not removed. However, from, say, the second or third iteration onward, anomalies may be removed. For example, in operation 4, a suitable anomaly detection technique may be used only after at least a threshold number of query-response pairs have become available to the system (at least a threshold number of queries have already been sent to the database and responded to by the database).

Operation 5: If anomalies are identified in operation 4, remove such anomalies from consideration, at least in the current iteration of the method of FIG. 1, and optionally also in subsequent iterations and/or store each anomaly's query parameters (for example: check-in day+number of nights) and responses, in an anomalies' database. These stored anomalies can later be used for direct evaluation of future anomalies, since anomalies, by definition, do not follow the general behavior of the data e.g. trends present in the data. Thus when estimating or predicting responses for queries which are identical to (or perhaps in the vicinity of) known anomalies, the anomalies DB may be used instead of the learned model that represents the behavior of the data minus the anomalies.

Optionally, the anomalies or special cases may be learned using a suitable ML (machine learning) technique such as a time series algorithm that takes into account only those special cases, and does not take into account the general behavior of the data other than the anomalies. For example, maybe the anomalies occur periodically, e.g. on the hour, or every Friday.

Operations 4, 5 may be omitted, so as to learn the database's behavior with anomalies, rather than separately mapping the anomalies, but this may require more queries to achieve.

In hotel-pricing use-cases, it turns out that an anomaly in the price of (say) a 5 nights stay on Oct $18^{th}$ which occurs when a price request query is sent on Oct $3^{rd}$, will, with high probability, recur if the query is sent the next day (Oct $4^{th}$) and the day after (Oct $5^{th}$). More generally, anomalies in this use case, and in other use-cases, are less dependent on parameters such as TTT (time to travel=number of days between the day the query is sent, and the day to which the response pertains e.g. number of days between booking day and check-in day. In contrast, the general behavior of the database (other than anomalies e.g.) may be highly dependent on the TTT parameter.

The operations, or of any subset thereof, may be performed, in any suitable order. For example, operations 4, 5 may be performed after operation 6, rather than before, and estimation of the level of confidence in operation 7 and/or computation of the model accuracy in operation 8, may be performed only after anomalies are removed from consideration as part of operation 5.

Operation 6: based on the query-response pairs in the training set without anomalies (e.g. all members of the training set which are not anomalies), compute a model (e.g. regression model, or any other model computed using conventional Artificial Intelligence techniques) describing the behavior of the database being queried. For the regression analysis, the independent variables may include the respective query parameters, and the dependent variable is the query response (e.g., depending on the use-case, level of urgency, price, recommended delivery method, recommended manufacturing facility, recommended route and so forth). For example, in a use-case involving triaging medical situations, or managing repairs for a household plumbing emergencies, auto repair emergencies or local failures of regional electric grid/s, queries may seek a response of how urgent each emergency or failure is believed to be. It is appreciated that alternatively, e.g. if some query parameters are nominal rather than numerical, a separate database may be maintained for each value of the nominal query parameter, in which case the model's independent variables include query parameters other than the nominal query parameter.

If several databases are being queried, a separate model is typically computed for each.

It is appreciated that references to "regression models" herein may be replaced with references to models in general.

Operation 7: Compute or estimate confidence levels for all queries in the universe of queries. Each confidence level for a query q in the universe quantifies the process's confidence in the value that the regression model returns for query q. Then, send a query with a relatively low confidence level, to the database. Typically, send at least one query whose estimated confidence level is lower than all or most other confidence levels estimated in this operation. For example, a query whose query parameters are as far as possible from the query parameters of those queries already asked and answered by the database, may be sent at this stage.

According to certain embodiments, more than one query is sent at this stage. For example, if queries have 4 parameters, 4 queries (or more, or less) may be sent, perhaps including one query in which the first parameter is as far as possible from the first query parameters of the queries already asked and answered by the database, another query in which the second parameter is as far as possible from the second query parameters of the queries already asked and answered by the database, and so forth. It is appreciated that, rather than sending 2 queries (e.g. one in which a first parameter is as far as possible from the first query parameters of the queries already asked and answered by the database, and another query in which the second parameter is as far as possible from the second query parameters of the queries already asked and answered by the database) in a single iteration, a query in which a first parameter is as far as possible from the first query parameters of the queries already asked and answered by the database may be sent in one iteration, and another query in which the second parameter is as far as possible from the second query parameters of the queries already asked and answered by the database may be sent in a subsequent e.g. the next iteration.

According to certain embodiments, plural models (all of which typically pass through all known points e.g. all known query, response pairs) are considered for selection as the current model, in operation 6. Typically, a model which falls close to the center or mode of the distribution of models which pass through all known points, is selected. Then, in operation 7, queries which are far from the known points hence, typically, distinguish well between the various models in the distribution of models, may be selected.

In Bayesian analysis, generally, the posterior distribution, or posterior, is "the distribution of a set of unknown parameters, latent variables, or otherwise missing variables of interest, conditional on the current data." The system may use posterior estimation using Bayesian methods with Gaussian processes. The system may use a multivariate Gaussian probability distribution of the functions.

Consider queries with a single independent variable x (say the number of nights in a hotel), wherein responses to the queries are numerical and constitute the single dependent variable y. Graph the available query, response pairs on the x-y coordinate system. Graph the various samples from the Gaussian process which fit the available data (the available pairs). Compute the mean of these samples (of the distribution of behaviors that fit the available data). Graph the mean and graph an area surrounding the graph of the mean, which is two standard deviations wide and represents the confidence for each input of x.

It is appreciated that instead of sending a single query, the system may send more than one query in Operation 7. For example, the system may send the K queries having the lowest confidence levels.

Operation 8: Stop here (end process), if error of current model meets stopping criterion.

Use the test set (typically without anomalies) to compute error or accuracy e.g. R-squared, on the test set (and optionally on the training set and test set altogether e.g. combined). The error is typically computed for all queries directed to that database, thus far. The more queries (and responses) accumulate, the higher (typically) is the accuracy and the lower the error. Thus, as query-response pairs accumulate, the accuracy increases, the error decreases, and, eventually, the accuracy/error is high/small enough to meet the stopping criterion.

The "Test Set" typically, although not necessarily, includes all previously asked queries, either over the entire timeline of operation of the system, or only those queries which were sent to the database during a window of time e.g. only the last hour, or 24 hours, or week. The test set typically also includes the answer to the new query sent most recently. A test set of one single new query response is typically not enough, thus if after Operation 8 the stopping criteria is met, a counter maintained by the system may be increased from zero by one and if (before increasing) the counter reaches a desired test size (e.g. 3 or 6 or 10 or any other integer), then stop, but if the counter is less than the desired test size, return to Operation 4 or 6. Any suitable stopping criteria may be employed e.g. accuracy of the model (such as R Squared) being above a threshold value (e.g. 0.9). Or, a diminishing returns criterion may be employed e.g. by submitting N (say 3) additional queries to the database and getting responses. The method may compare the N responses received to N estimated responses using the regression model, including measuring the error rate e.g. R squared of the N e.g. 3 returned query responses. If submitting the N additional queries significantly (over threshold %) improved the regression accuracy (e.g. of a model built with the N queries, vis-a-vis a previous model built without them) by at least a threshold amount, then submit more queries e.g. N more queries, and continue trying to improve the model. Having measured the accuracy post-the N additional queries, if the accuracy is inadequate e.g. below a certain threshold, the system may build a new regression model that now takes into account the previous results and the N additional queries.

The above process treats queries which do not follow the database's standard behavior separately from queries that do follow the database's standard behavior.

The above process builds a model (e.g. regression model) iteratively; in each iteration a (small) set of queries is executed.

According to some embodiments, Operation 1 is performed including executing a few initial queries as described. Alternatively, Operation 1 is performed but with only 1 single query, and the model decides about subsequent queries, repeatedly, in Operation 4. The process then typically returns to Operation 4. Iterative request submission then occurs in Operation 7, either once, or over and over, until the model (e.g. regression) accuracy is adequate (e.g. satisfies a stopping criterion). The model accuracy (typically 100%, minus an error of the current model which may be computed in Operation 6) is typically re-evaluated, to ensure that the number of queries required to build a model that achieves a given accuracy criterion, is minimal.

The selection of (or model lookup for) new queries (Operation 7) is efficient at least because the model lookup (or selection of the next query) is not random; instead combinations (of query parameters e.g.) are used which are associated with a lower level of confidence, e.g. due to their greater distance from already-asked queries, relative to query parameter combinations which, due to their smaller distance from already-asked queries, are associated with a higher level of confidence.

Any suitable technology may be used to implement the iterative learning—for example Active Learning for Regression based on Gaussian Processes can be used for Operation 6 which is configured to compute a regression model.

It is appreciated that a (typically deep) neural network may be provided, that will learn to provide the next query based on a time series of earlier queries' parameters and results—e.g. as described here: https://arxiv.org/abs/1806.09856.

Any suitable conventional technology may be used to implement the iterative learning of which use of Active Learning for Regression based on Gaussian Processes for computing a model, e.g. regression model, is but one example.

Additional data may be used to improve the model such as but not limited to:
  a. Last days data: The model can be fed with data from recent days in order to take into account cases where the prices remain or follow the same trend in subsequent days.
  b. Anomaly days data: for certain dates the price may not follow a trend, and instead may be determined by an anomaly e.g. occurrence of a special occasion or event such as, in Traveltech, holidays, weekends, conferences. A regression model may be inefficient for those cases, and, therefore, the method of the present invention is typically designed to isolate such cases from the iterative regression. In case of prediction, the query may first be evaluated based on the collected data of such anomalous dates (or any model that predicts based on the anomalous data) and then, if not met with any anomaly, evaluated using the regression model.
  c. Stable query-response data: Over multiple iterations, it is possible to follow or track combinations of query-parameters (for example, in Traveltech, a certain number of nights and check-in date ranges) that elicit a stable query response. Those combinations can be stored and used e.g. for the following day model. This yields higher confidence that usage of query-parameter combinations that elicit query responses vary widely over time.

"Database querying" herein is intended to include any variety of service querying or service requests; typically the server constructed and operative in accordance with any embodiment herein, is the client, and the server's providers may comprise services that the server requests in order to get query responses quotes for incoming queries.

Any suitable method may be used to select independent variables or query parameters. For example, variables may be chosen by human system designers, to include parameters known to have a substantial effect on the query response.

A database or provider may share a secure API with a server operative in accordance with any embodiment herein, and, using this API, the server may submit queries to the database or provider. Queries may be presented to databases using any customized protocol or query language, or may be presented in a conventional query language.

Queries may, according to some embodiments, not be generated by a server operative in accordance with any embodiment herein, and instead may be selected from among incoming requests to the server from the server's end-users. Such incoming requests may be responded to by the server, either by passing a query on to a database, or by returning a query response using data that the server already has in a cache storing a previous query, response pairs which already have been asked and answered, by the database.

Any suitable method may be employed to define distance between 2 queries, each having k query parameters. For example, a distance may be defined, for each parameter, between each pair of parameter values for that parameter (e.g. subtraction, for numerical parameters and designer-defined distances, non-numerical parameters are used). These distances (or the parameter values themselves) may then be normalized between parameters. Then, distances between queries may be computed, as is distance between vectors e.g. using L1 Norm (Manhattan distance) or L2 Norm (Euclidean distance), or any conventional measure of distance between vectors. Weights may be combined per each feature/dimension e.g. to express importance of a specific feature to a target function.

For non-numerical query parameters, any suitable method for converting categorical data into numerical data may be employed, such as but not limited to Embedding (Cat2Vec), One-Hot encoding, and dummy coding.

It is appreciated that the embodiments herein have wide applicability; example use-cases are described below.

In any of the following examples, monitoring or testing may be performed by physical sensors which may be manually or automatically triggered, actuated, controlled, and operated.

Use-case a: Software platform including a hardware processor which quantifies danger of collapse of a large population of buildings, based on physical testing of only a subset of the population of buildings.

The prediction may be for some "safety grade" of a certain building, e.g. estimated probability of collapse, which is hoped to be zero, or near-zero, but may not be so. The query parameters or factors may include factors, such as but not limited to physical location e.g. humidity, distance to sea etc., number of floors, age of building, etc., and it may be costly to measure that "safety grade" which may require an expert in this field to perform a long series of tests per building. The "safety grade" may be assumed to behave continuously, and may be assumed to maintain order ratios with the given factors.

Use-case b: Software platform including a hardware processor which screens for high-risk patients within a large population of patients, based on physical testing of only a subset of the population of patients.

Continuity of the behavior (e.g. with values of blood count test for example) may be assumed. Practically, in this case or others, it may, or may not be possible, to obtain certain requested query results e.g. from specific patients with specific blood test values combination e.g. if no such patients are known or accessible, in which case a different query, which also has a low confidence level, may be generated by the system.

Use-case c: Software platform including a hardware processor which predicts hotel prices generated by hotel pricing systems, for each of a large population of queries from would-be vacationers, where the hotel stay costs are generated by a computerized hotel pricing system, including a database responsive to queries, submitted to the hotel pricing system/database, which are only a subset of a "population" of possible queries. Each query typically includes query parameters, aka "factors", such as length of stay, and time to travel.

According to certain embodiments, a model or "hypothesis" is generated, of how hotel stay cost is affected by factors, yielding a computation or model that predicts the deal price per any combination of factor values. Typically, the model is learned gradually by sending specific queries selected to increase model certainty. Here and in other embodiments, the database's response generation functionality is assumed to be characterized by a systematic behavior (e.g. a combination of trends, continuity). Example: evidence of a trend/behavior with prices for similar or adjacent parameters is when a room for 3 days tends to be X % less, in cost, than a room for 4 days.

Use-case d. Software platform which predicts danger (e.g. probability from 0 to 1) of pest infestation of a large population of crops or plants, based on physical monitoring for actual infestation, of only a subset of the large population of crops or plants.

Use-case e: Software platform including a hardware processor which identifies faulty or dangerous equipment (at a high level of probability) deployed in a large number of sites, based on physical monitoring of only a subset of the sites. For example, the system may wish to predict which household boilers, used to heat water for household use, are likely to explode, by generating a probability variable whose value is between 0 and 1. Query parameters may include age of boiler, type of boiler, and other parameters available via an Internet of Things communication network between boilers deployed in a network maintained by a central entity.

Use-case f: Software platform including a hardware processor which identifies faulty or dangerous members of a fleet of vehicles (likely to cause a fatal accident at a high level of probability p), based on testing of only a subset of the vehicles.

Use-case g: Software platform including a hardware processor which identifies persons at high risk of contracting an infectious disease e.g. from others e.g. from an epidemic, based on physical testing of only a subset of persons, for that disease.

Use-case h: Software platform including a hardware processor configured for determining how many members and/or which members, to include in a training set which is intended to train a classifier or other AI software (for example: if a vehicle is to be taught to recognize any traffic light in the world, which photographs which traffic lights, and how many, should be included in a training set of traffic light images which are then classified e.g. by humans, into images which do/do not include a traffic light.

Use-case i: Software platform including a hardware processor configured to determine which locations in the world should be monitored by weather forecasting or crop monitoring or air monitoring equipment, including providing commands to unmanned airborne or seaborne weather forecasting or crop monitoring or air monitoring equipment https://www.noaa.gov/stories/6-tools-our-meteorologistsuse-to-forecast-weather which identify which locations should be imaged or otherwise sampled, each day or other time-period. For example, the system may predict which locations tend to have weather which is typical of a larger area e.g. country or continent. The results of this determining operation may control a suitable actuator, such as a satellite, which remotely monitors e.g. images various global locations.

The scope of the invention includes any method for minimizing queries to a database, the method comprising all or any subset of the following stages, each or any of which, separately or in combination, may be combined with any operation or embodiment described herein:

Stage a: Sending at least one first query, having at least one query parameter having at least one first query parameter values respectively, to the database, and receiving, from the database, at least one response to the at least one query respectively; and/or Stage b: Using at least the query and the response to compute a model which approximates the database's behavior wherein the behavior includes generating responses in reply to queries received, and wherein the model which approximates the database's behavior, serves as the method's current model, unless and until the method's current model is replaced by a later computed model; and/or At least once (typically plural times e.g. until a stopping criterion is reached) performing an iteration which includes the following stage c and/or stage d:

Stage c: selecting at least one query, from a universe of queries including plural queries, each having parameters, wherein the plural queries' parameters are at plural respective distances from the at least one first query's at least one query parameters; and wherein the at least one query which is selected, is more distant from the at least one first query's at least one query parameters than is at least one query in the universe which is not selected; and/or Stage d: Sending the at least one query which was selected from the universe, to the database, receiving the database's response; and/or using: the database's response, and/or the at least one query selected from the universe, and/or at least one query and response already used, to compute another model of the database's behavior.

Typically, the other model (e.g. "another model") thus computed, in stage d, serves as the method's current model, unless and until the method's current model is replaced by a later computed model e.g. in a subsequent iteration.

The term "database" as used herein may comprise any conventional database system and may include database management system (DBMS) software, run on sever/s, that interacts with applications and the data repository itself. The database may or may not be relational (or non-relational), and may or may not use SQL or XQuery for querying. The database's server or server cluster may comprise any computer/s that may hold the data and may run a DBMS and/or other software. The Database servers may comprise multiprocessor computer/s, and/or RAID disk arrays and/or Hardware database accelerators, which may be connected to server/s via a high-speed channel, and/or a custom multi-tasking kernel which may or may not be provided by a standard operating system.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently, rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices, each including at least one processor and/or cooperating input device and/or output device and operative to perform, e.g. in software, any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations, or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented, e.g. by one or more processors. The invention shown and described herein may include (a) using a computerized method to identify a solution to any of the problems or for any of the objectives described herein, the solution optionally including at least one of a decision, an action, a product, a service or any other information described herein, that impacts, in a positive manner, a problem or objectives described herein; and (b) outputting the solution.

The system may, if desired, be implemented as a network, e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false, and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may more generally cause any outcome which is technically advantageous, given the state or condition or data, and/or may prevent at least one outcome which is disadvantageous given the state or condition or data. Alternatively or in addition, an alert may be provided to an appropriate human operator or to an appropriate external system.

Features of the present invention, including operations which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section, or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling, such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation, and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK, as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network, or is tethered directly or indirectly/ultimately to such a node).

Any operation or characteristic described herein may be performed by another actor outside the scope of the patent application and the description is intended to include apparatus, whether hardware, firmware or software which is configured to perform, enable or facilitate that operation, or to enable, facilitate or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD). Any operation or functionality or computation or logic described herein may be implemented entirely or in any part on any suitable circuitry, including any such computer microprocessor/s, as well as in firmware or in hardware or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately, or in any suitable sub-combination, including with features known in the art. Each element e.g. operation described herein, may have all characteristics and attributes described or illustrated herein, or, according to other embodiments, may have any subset of the characteristics or attributes described herein.

The invention claimed is:

1. A method for querying a database, the method comprising
    sending at least one first query, having at least one query parameters having at least one first query parameter values respectively, to the database, and receiving, from the database, at least one response, including a numerical value, to said at least one query respectively;
    using at least said query and said response to compute a model which approximates the database's behavior wherein said behavior includes generating responses in reply to queries received, and wherein said model which approximates the database's behavior serves as the method's current model, unless and until the method's current model is replaced by a later computed model;
    at least once:
        selecting at least one query, from a universe of queries including plural queries, each having parameters, wherein said plural queries' parameters are at plural respective distances from said at least one first query's at least one query parameters; and wherein said at least one query which is selected, is more distant from said at least one first query's at least one query parameters than is at least one query in the universe which is not selected;
        sending said at least one query which was selected from the universe, to the database, receiving the database's response; and using:
            said database's response, and said at least one query selected from the universe, and
            at least one query and response already used,
    to compute another model of the database's behavior, wherein said another model serves as the method's current model, unless and until the method's current model is replaced by a later computed model.

2. A method according to claim 1 wherein said selecting and said sending are repeated unless the method's current model satisfies a stopping criterion.

3. A method according to claim 2 wherein said stopping criterion is applied to the current model's accuracy level.

4. A method according to claim 1 and wherein said at least one query which is selected, is, relative to plural other queries in the universe of queries, which were not yet selected, most distant from said at least one first query's at least one query parameters.

5. A method according to claim 1 and wherein said at least one query which is selected, is, relative to most other queries not yet selected in the universe of queries, most distant from said at least one first query's at least one query parameters.

6. A method according to claim 1 and wherein said at least one query which is selected, is, relative to all other queries in the universe of queries which were not yet selected, most distant from said at least one first query's at least one query parameters.

7. A method according to claim 1 wherein regression is used to compute said model which approximates the database's behavior.

8. A method according to claim 1 wherein said current model is used to generate responses to at least one query which is not sent to the database.

9. A method according to claim 1 wherein at least one query sent to the database by said method, is an anomaly whose response does not fit the current model, and wherein at least one later computed model, computed later than said current model, is computed without relying on said query which is an anomaly and on said response to said query which is an anomaly.

10. A method according to claim 9 wherein at least one query which is an anomaly, is used to generate a response to at least one subsequent query which is not sent to the database and wherein said at least one query which is an anomaly has at least one parameter which is identical to at least one parameter of said at least one subsequent query.

11. A system comprising at least one hardware processor configured to carry out the operations of the methods of claim 1.

12. A computer program product, comprising a non-transitory tangible computer readable medium having computer readable program code embodied therein, said computer readable program code adapted to be executed to implement a method for querying a database, the method comprising
    sending at least one first query, having at least one query parameters having at least one first query parameter values respectively, to the database, and receiving, from the database, at least one response, including a numerical value, to said at least one query respectively;
    using at least said query and said response to compute a model which approximates the database's behavior wherein said behavior includes generating responses in reply to queries received, and wherein said model which approximates the database's behavior serves as the method's current model, unless and until the method's current model is replaced by a later computed model;
    at least once:
        selecting at least one query, from a universe of queries including plural queries, each having parameters, wherein said plural queries' parameters are at plural respective distances from said at least one first query's at least one query parameters; and wherein said at least one query which is selected, is more distant from said at least one first query's at least one query parameters than is at least one query in the universe which is not selected;
        sending said at least one query which was selected from the universe, to the database, receiving the database's response; and using:

said database's response, and said at least one query selected from the universe, and at least one query and response already used, to compute another model of the database's behavior, wherein said another model serves as the method's current model, unless and until the method's current model is replaced by a later computed model.

\* \* \* \* \*